US011946306B2

(12) United States Patent
Chen et al.

(10) Patent No.: US 11,946,306 B2
(45) Date of Patent: Apr. 2, 2024

(54) AUTOMATIC DOOR OPERATOR

(71) Applicant: Assa Abloy Entrance Systems AB, Landskrona (SE)

(72) Inventors: Yong Chen, Suzhou Jiangsu (CN); Jingfeng Zhang, Suzhou Jiansu (CN)

(73) Assignee: Assa Abloy Entrance Systems AB, Landskrona (SE)

( * ) Notice: Subject to any disclaimer, the term of this patent is extended or adjusted under 35 U.S.C. 154(b) by 116 days.

(21) Appl. No.: 17/441,981

(22) PCT Filed: Mar. 27, 2020

(86) PCT No.: PCT/EP2020/058758
§ 371 (c)(1),
(2) Date: Sep. 22, 2021

(87) PCT Pub. No.: WO2020/201110
PCT Pub. Date: Oct. 8, 2020

(65) Prior Publication Data
US 2022/0162897 A1 May 26, 2022

(30) Foreign Application Priority Data
Apr. 3, 2019 (CN) ......................... 201910268086.9

(51) Int. Cl.
*E05F 15/622* (2015.01)
*E05F 15/63* (2015.01)

(52) U.S. Cl.
CPC ............ *E05F 15/622* (2015.01); *E05F 15/63* (2015.01); *E05Y 2201/434* (2013.01); (Continued)

(58) Field of Classification Search
CPC ....... E05F 15/622; E05F 15/63; E05F 15/611; E05F 15/616
See application file for complete search history.

(56) References Cited

U.S. PATENT DOCUMENTS 2,592,891 A * 4/1952 Hall ...................... E05F 15/622 49/340
4,220,051 A * 9/1980 Catlett .................... E05F 3/102 74/89.17

(Continued)

FOREIGN PATENT DOCUMENTS

CN 204850919 12/2015
CN 104533211 4/2022

(Continued)

OTHER PUBLICATIONS

International Search Report in PCT/EP2020/058758 dated Jul. 16, 2020.
Chinese Office Action in 2019102680869, dated Mar. 19, 2020.

*Primary Examiner* — Gregory J Strimbu
(74) *Attorney, Agent, or Firm* — Wissing Miller LLP

(57) ABSTRACT

An automatic door operator includes a lead screw having a first end connected to an output end of an actuating unit and a second end extending away from the output end. A lead screw nut is attached to the lead screw. A slider is attached to the lead screw nut. The slider is provided with a rack portion extending in a direction parallel to an axial direction of the lead screw, and during a movement of the lead screw nut, a length of an overlap of the rack portion and the lead screw in the axial direction varies. The operator includes a housing having a guide hole configured to be slidably engaged with the slider and an output shaft is mounted in a mounting hole disposed on the housing. The output shaft has a gear portion positioned in the guide hole and engaged with the rack portion.

9 Claims, 2 Drawing Sheets

(52) U.S. Cl.
CPC ..... *E05Y 2201/626* (2013.01); *E05Y 2201/70* (2013.01); *E05Y 2201/702* (2013.01); *E05Y 2201/722* (2013.01); *E05Y 2900/132* (2013.01)

(56) References Cited

U.S. PATENT DOCUMENTS

| | | | | | |
|---|---|---|---|---|---|
| 4,339,843 | A * | 7/1982 | Burnett, Jr. | E05F 3/224 | 49/32 |
| 4,580,365 | A * | 4/1986 | Sieg | E05F 3/224 | 16/49 |
| 4,660,250 | A * | 4/1987 | Tillman | E05F 1/006 | 16/DIG. 9 |
| 5,513,467 | A * | 5/1996 | Current | E05F 15/63 | 49/340 |
| 5,913,763 | A | 6/1999 | Beran et al. | | |
| 8,779,713 | B2 * | 7/2014 | Burris | E05F 3/224 | 318/264 |
| 2003/0097794 | A1 | 5/2003 | Brennwald | | |
| 2007/0022664 | A1 * | 2/2007 | Mahonen | E05F 15/63 | 49/342 |
| 2020/0408024 | A1 * | 12/2020 | Kummer | B60J 5/106 | |

FOREIGN PATENT DOCUMENTS

| | | |
|---|---|---|
| DE | 102015211503 | 12/2016 |
| WO | 2005026486 | 3/2005 |

* cited by examiner

AUTOMATIC DOOR OPERATOR

This application is a 371 of PCT/EP2020/058758, filed on Mar. 27, 2020, published on Oct. 8, 2020 under publication number WO 2020/201110, which claims priority benefits from Chinese Patent Application No. 201910268086.9, filed on Apr. 3, 2019, the disclosure of which is incorporated herein by reference.

TECHNICAL FIELD

The present disclosure relates to an automatic door operator.

BACKGROUND

Automatic door operator is broadly used in the field of automatic door opening and closing. In a conventional electric drive automatic door operator, the torque output from an electric motor is transmitted to an output shaft via a gear train transmission system, the output shaft drives an arm of a rocker arm system to swing, and thus the rocker arm system drives the door to open or close. However, the gear train transmission system has disadvantages of relatively low transmission ratio, low transmission efficiency, large volume and large noise, which cannot meet the market demand for the automatic door operator with high transmission efficiency, small size and low noise.

SUMMARY

The present disclosure aims to provide an automatic door operator with high transmission efficiency, small size and low running noise.

The present disclosure provides an automatic door operator including: an actuating unit configured to output torque; a lead screw having a first end connected to an output end of the actuating unit and a second end extending away from the output end; a lead screw nut screwed to the lead screw; a slider attached to the lead screw nut, the slider being provided with a rack portion extending in a direction parallel to an axial direction of the lead screw, and during a movement of the lead screw nut from a first extreme working position away from the first end of the lead screw to a second extreme working position close to the second end of the lead screw, a length of an overlap between the rack portion and the lead screw in the axial direction gradually increasing; a housing having a guide hole configured to be slidably engaged with the slider; and an output shaft mounted in a mounting hole disposed on the housing, the output shaft having a gear portion positioned in the guide hole and engaged with the rack portion.

Further, the slider is configured as a piston slidably engaged within the guide hole. A receiving recess is disposed on an outer peripheral surface of the piston, and the rack portion is disposed on a side wall surface of the receiving recess. An end of the piston close to the lead screw nut is provided with a through hole, and the lead screw extends into the receiving recess through the through hole.

Further, the piston is screwed with the lead screw nut.

Further, the through hole is provided with an internal threaded section, and the lead screw nut is provided with an external threaded section connected to the internal threaded section. A hole wall of the through hole is provided with a set screw hole, and a set screw abutting against an outer peripheral surface of the lead screw nut is mounted in the set screw hole.

Further, the receiving recess extends through the outer peripheral surface of the piston.

Further, the outer peripheral surface of the piston is further provided with at least one annular recess, and a wearing ring is mounted within each of the at least one annular recess.

Further, the outer peripheral surface of the piston is provided with two annular recesses, and the receiving recess is positioned between the two annular recesses.

Further, a bearing is disposed between the output shaft and the mounting hole, and an end portion of the output shaft is provided with a face tooth configured to output torque.

Further, the actuating unit includes a motor and a planetary reducer coupled to the motor, and the planetary reducer has an output end acting as the output end of the actuating unit.

Further, another end of the slider away from the lead screw nut is provided with a guide rod. The guide rod is sleeved with a spring. The spring is configured to be compressed when the lead screw nut moves toward the first end of the lead screw.

The automatic door operator provided by the present disclosure adopts a manner of cooperating a screw drive system and a gear rack transmission mechanism to transmit power, and thus the automatic door operator has advantages of high transmission efficiency, high transmission precision and low running noise. In addition, the automatic door operator has a compact structure and a small space size by means of making the axial running space of the rack portion partially overlap the axial space portion occupied by the lead screw itself.

DETAILED DESCRIPTION

Figure 1:
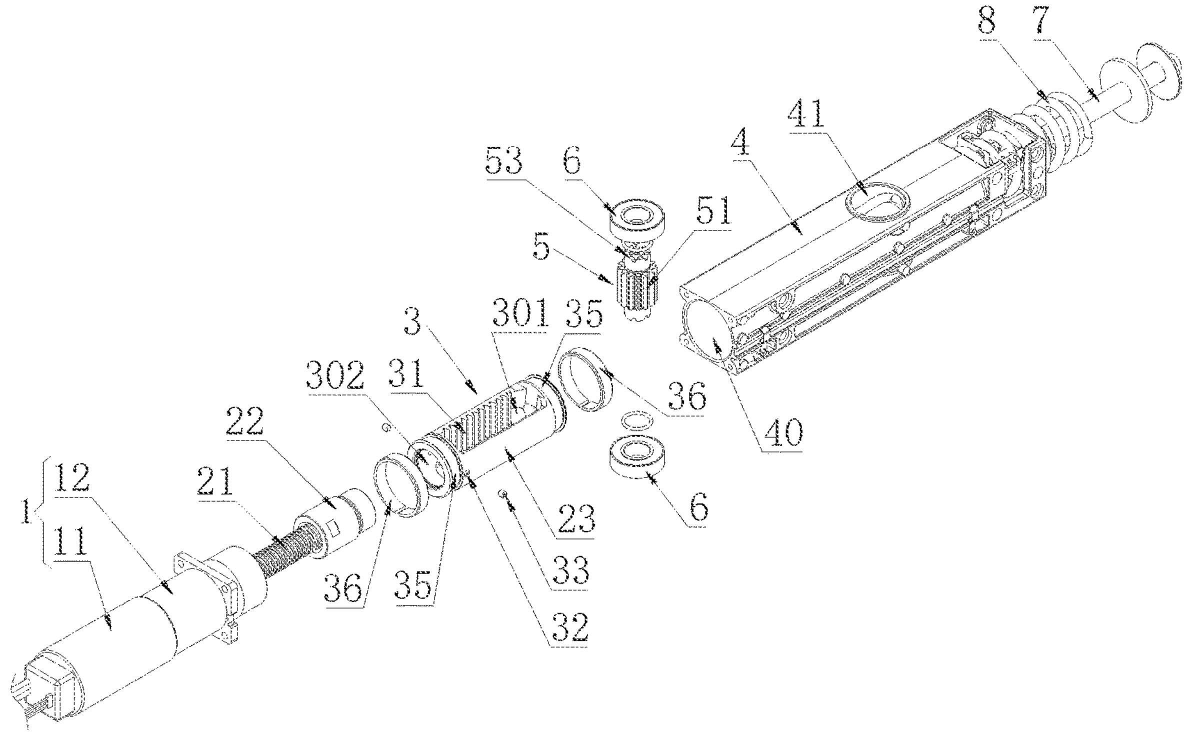
FIG. 1 is a schematic exploded view of an automatic door operator according to an embodiment of the present disclosure.
Figure 2:
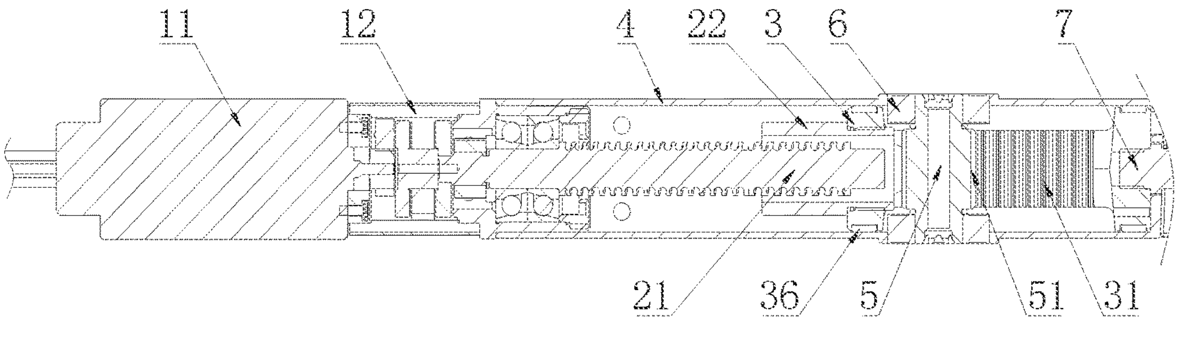
FIG. 2 is a cross-sectional view of an automatic door operator according to an embodiment of the present disclosure.

FIG. 1 and FIG. 2 illustrate a configuration of an automatic door operator provided by a preferred embodiment of the present disclosure. The automatic door operator includes an actuating unit 1, a screw drive system including a lead screw 21 and a screw nut 22, a slider 3, a housing 4, an output shaft 5, and others.

Specifically, the actuating unit 1 is configured to output torque in order to provide a power source for automatically opening and closing the door. The actuating unit 1 preferably includes a motor 11 and a planetary reducer 12 coupled to the motor, and the planetary reducer has a power output end acting as the output end of the actuating unit 1 to output torque to an external device. The planetary reducer 12 may be, for example, a one-stage planetary reducer, a two-stage planetary reducer or a three-stage planetary reducer. The number of reduction stages of the planetary reducer 12 may be set as required. The use of the planetary reducer 12 to transmit power enables a higher transmission ratio in a smaller occupied space, and it is beneficial to improve transmission accuracy and transmission efficiency as well as reduce running noise. Of course, the configuration of the actuating unit 1 is not limited to the above examples as long as it can provide the required torque.

The first end of the lead screw 21 is connected to the output end of the actuating unit 1, and the second end of the lead screw 21 extends away from the output end. The torque output from the output end of the actuating unit 1 is transmitted to the lead screw 21 in order to rotate the screw 21. The lead screw nut 22 is screwed to the lead screw 21. It is known from the prior art that by limiting the rotation of the lead screw nut 22, the rotation of the lead screw 21 can be converted into the axial movement of the lead screw nut 22 along the lead screw 21. The screw drive system including the lead screw 21 and the lead screw nut 22 may be a ball screw drive system or a trapezoidal screw drive system. The screw drive system has advantages of high transmission ratio, high transmission efficiency, high transmission precision and low running noise, etc.

The slider 3 is attached to the lead screw nut 22, that is, the slider 3 is able to move with the lead screw nut 22 in the axial direction, without rotating about the axis of the lead screw 21. The connection between the slider 3 and lead screw nut 22 may be a detachable connection or a non-detachable (for example, welding) connection, as long as they are able to be fixed together. Preferably, in this embodiment, the slider 3 and the lead screw nut 22 are detachably connected together by means of a threaded connection.

Figure 3:
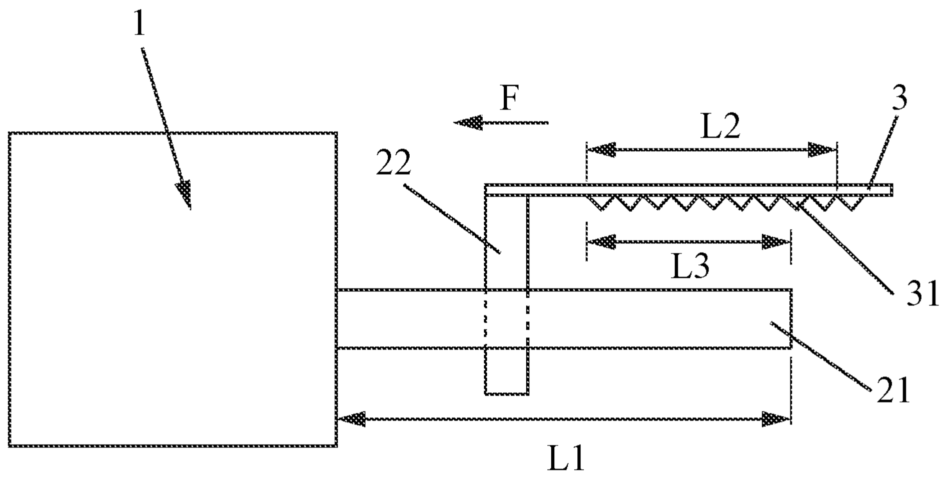
FIG. 3 is a schematic diagram showing movements of a lead screw, a lead screw nut and a slider in an automatic door operator according to an embodiment of the present disclosure.

The slider 3 is provided with a rack portion 31 extending in a direction parallel to the axial direction of the lead screw 21, and the rack portion 31 linearly moves with the movement of the slider 3. More importantly, during a movement of the lead screw nut 22 from a first extreme working position away from the first end of the lead screw 21 to a second extreme working position close to the second end of the lead screw 21, a length of an overlap between the rack portion 31 and the lead screw 21 in the axial direction can gradually increase. That is, the axial running space of the rack portion 31 partially overlaps the axial space occupied by the lead screw 21. Referring to FIG. 3, L1 denotes an axial length of the lead screw 21, L2 denotes an axial length of the rack portion 31, and L3 denotes an overlapped length in the axial direction between the rack portion 31 and the lead screw 21. It can be understood that the first extreme working position and the second extreme working position of the lead screw nut 22 are determined by a set effective working travel. In the process of opening and closing the door, the lead screw nut reciprocates between the first extreme working position and the second extreme working position. According to the technical solution of the present disclosure, during the movement of the lead screw nut 22 from the first extreme working position to the second extreme working position in the direction indicated by the arrow F, the rack portion 31 and the lead screw 21 gradually overlap in the axial direction (it can be understood that they are radially spaced apart from each other at a predetermined distance so as not to interfere with each other), thereby making full use of the axial space occupied by the lead screw 21 and facilitating to reduce the overall axial length and the volume of the automatic door operator.

In addition, it should be noted that, in this embodiment, during the movement of the lead screw nut 22 from the first extreme working position away from the first end of the lead screw 21 to the second extreme working position close to the first end of the screw 21, the length of the overlap between the rack portion 31 and the lead screw 21 in the axial direction can gradually increase, which can include the following two situations, In the first situation, when the lead screw nut 22 is at the first extreme working position, the rack portion 31 and the lead screw 21 do not overlap at all in the axial direction. When the lead screw nut 22 moves a certain distance toward the second extreme working position, the rack portion 31 and the lead screw 21 start to overlap in the axial direction. Then the length of the overlap between the rack portion 31 and the lead screw 21 in the axial direction gradually increases as the lead screw nut continues to move to the second extreme working position.

In the second situation, when the lead screw nut 22 is at the first extreme working position, the rack portion 31 and the lead screw 21 overlap in the axial direction already. The length of the overlap between the rack portion 31 and the lead screw 21 in the axial direction gradually increases as the lead screw nut 22 continues to move to the second extreme working position.

Figure 4:
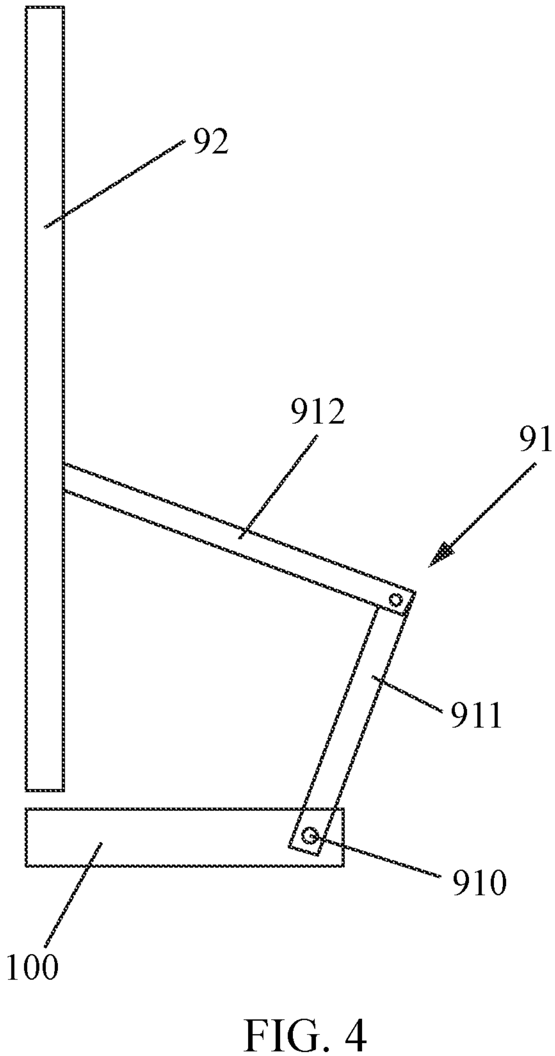
FIG. 4 is a schematic diagram showing an automatic door operator according to an embodiment of the present disclosure applied to a door.

The housing 4 has a guide hole 40 configured to be slidably engaged with the slider 3. A hole wall of the guide hole 40 supports the slider 3, so that the lead screw 21 is supported by the lead screw nut 22. In some embodiments not shown, a suitable structure may be provided between the housing 4 and the slider 3 to limit a relative rotation between the slider 3 and the housing 4, thereby limiting the rotation of the lead screw nut 22. The housing 4 is also provided with a mounting hole 41, the mounting hole 41 is positioned in the hole wall of the guide hole 40, and a central axis of the mounting hole 41 is perpendicular to the axis of the lead screw 21. The output shaft 5 is mounted in the mounting hole 41, and the output shaft 5 has a gear portion 51 positioned in the guide hole 40 and engaged with the rack portion 31. It can be understood that the linear motion of the rack portion 31 is converted into the rotation of the gear portion 51 by the engagement between the gear portion 51 and the rack portion 31. Referring to FIG. 4, the gear portion 51 drives an arm of a rocker arm system to swing, and in turn the door 92 is driven to open or close. In addition, the engagement between the gear portion 51 and the rack portion 31 can also act as restricting the relatively rotation between the slider 3 and the housing 4. Preferably, the housing 4 also has a portion that surrounds the lead screw 21 such that the lead screw 21 is placed in a closed space to prevent debris from depositing on the lead screw 21, in order not to affect the normal operation of the screw drive system.

There may be many configurations of the slider 3. For example, the slider 3 may be in an elongated structure with a rectangular cross section as schematically shown in FIG. 3. Furthermore, a preferred configuration of the slider 3 is shown in FIG. 1 and FIG. 2, in which the slider 3 is configured in a form of a piston that is slidably engaged with the guide hole 40. As to the slider 3 of the piston configuration, the guide hole 40 may be a circular bore and the piston may have a substantially circular outer contour. In order to easily dispose the rack portion 31 on the piston, it can be seen from FIG. 1 that the outer peripheral surface of the piston is provided with a receiving recess 301 which may have two opposite side wall surfaces parallel to the axis of the lead screw 21, the rack portion 31 is disposed on one of the side wall surfaces, and the gear portion 51 is engaged with the rack portion 31 in the receiving recess 301. A through hole 302 through which the lead screw 21 passes is disposed at one end of the piston close to the lead screw nut 22, so that when the lead screw nut 22 moves from the first extreme working position to the second extreme working position, the lead screw 21 can pass through the through hole 302 and then extend into the receiving recess 301. As the lead screw nut 22 moves, a length of a part of the lead screw extending into the receiving recess 301 gradually increases. The piston provided with the receiving recess 301 has a large contact range with the guide hole 40, so that the piston is subjected to a evenly force, thereby ensuring the reliable operation of the piston.

It should be noted that the receiving recess 301 may pass through the outer peripheral surface of the piston or not. In order to reduce the difficulty in processing the receiving recess 301 and the rack portion 31, as shown in FIG. 1, the receiving recess 301 extends through the outer peripheral surface of the piston in this embodiment. Meanwhile, the output shaft 5 may pass through the receiving recess 301. Mounting holes 41 are formed on positions of the housing 4 corresponding to the two ends of the output shaft 5 respectively, the two ends of the output shaft 5 are respectively rotatably engaged with the corresponding mounting holes 41, and thus the output shaft 5 is not easily deformed due to an uneven force. Of course, when the receiving recess 301 does not pass through the outer peripheral surface of the piston, one end of the output shaft 5 is positioned in the receiving recess 301, and the other end of the output shaft 5 is rotatably engaged with the mounting hole 41. In addition, in some embodiments not shown, the receiving recess 301 may pass through the outer peripheral surface of the piston and one end face of the piston away from the lead screw nut 22. That is, the receiving recess 301 may at least pass through the outer peripheral surface of the piston. Preferably, a bearing 6 is disposed between the output shaft 5 and the mounting hole 41 in order to reduce friction loss during the rotation of the output shaft 5.

Preferably, a face tooth 53 configured to output torque is disposed at an end of the output shaft 5. The face tooth 53 is in a concave-convex engagement with a face tooth on a docking shaft 910 of the rocker arm system 91, thereby outputting the rotation of the output shaft 5 to the rocker arm system. Of course, the output shaft 5 may output torque by other suitable structures, details of which will not be described herein. In this embodiment, the rock arm system 91 includes a first arm 911 and a second arm 912 hinged to the first arm 911. The docking shaft 910 is disposed on the first arm 911, and the second arm 912 is hinged to a door 92. When the output shaft 5 rotates, the first arm 911 is driven to rotate, and then the door 92 is driven to rotate through the second arm 912.

Preferably, in this embodiment, the piston and the lead screw nut 22 are connected together by screw threads. Specifically, the through hole 302 is provided with an internal threaded section, and the lead screw nut 22 is provided with an external thread section. The internal threaded section is adapted to be connected to the external threaded section. In order to prevent the connection between the piston and the lead screw nut 22 from becoming loose, a set screw hole 32 is disposed in the hole wall of the through hole 302, and a set screw 33 abutting against the outer peripheral surface of the lead screw nut 22 is mounted in the set screw hole 32.

Referring again to FIG. 1 and FIG. 2, in this embodiment, the outer peripheral wall of each of the two ends of the piston 3 is respectively provided with one annular recess 35, and the receiving recess 301 is positioned between the two annular recesses 35. Each of the annular recesses 35 is provided with a wear ring 36 therein. When the piston moves axially, the outer peripheral surface of the wear ring 36 contacts the hole wall of the guide hole 40. The wear ring 36 may be made of plastic material with lubricity, low friction coefficient and wear resistance, so that the piston is not required to be lubricated with lubricating oil, thereby without problem of oil leakage. Of course, in other embodiments, one or more annular recesses 35 for mounting the wear ring(s) 36 may be disposed on the outer peripheral surface of the piston as required.

It can be seen from FIG. 1 that another end of the slider 3 away from the lead screw nut 22 is provided with a guide rod 7 which is sleeved with a spring 8. The spring 8 may be configured to be compressed to store energy, when the lead screw nut 22 moves towards the first end of the lead screw 21. When the actuating unit 1 malfunctions or is powered off, the spring 8 automatically releases energy to push the slider 3 to move, thereby causing the rocker arm system 91 and the door 92 to swing. For example, it can be achieved that the door 92 is automatically closed. That is, the automatic door operator has an automatic return function by the arrangement of the spring 8, so that it can be applied to the field of fire doors.

The above-mentioned embodiments are merely illustrative of several embodiments of the present disclosure, and the description thereof is more specific and detailed, but it is not to be construed as limiting the scope of the present disclosure. It should be noted that a number of variations and modifications may be made by those skilled in the art without departing from the spirit and scope of the invention. Therefore, the scope of the invention should be determined by the appended claims.

The invention claimed is:

1. An automatic door operator, comprising:

an actuating unit configured to output torque;

a lead screw having a first end connected to an output end of the actuating unit and a second end extending away from the output end;

a lead screw nut threadedly engaged with the lead screw;

a slider, wherein a first end of the slider is attached to the lead screw nut, wherein the slider is provided with a rack portion extending in a direction parallel to an axial direction of the lead screw, and during a movement of the lead screw nut from a first extreme working position away from the first end of the lead screw to a second extreme working position close to the first end of the lead screw, a length of an overlap of the rack portion and the lead screw in the axial direction increases;

a housing having a guide hole configured to be slidably engaged with the slider;

an output shaft mounted in a mounting hole disposed in the housing, wherein the output shaft has a gear portion positioned in the guide hole and engaged with the rack portion;

a guide rod affixed to a second end of the slider for movement therewith; and a spring surrounding the guide rod, wherein the spring is captive between an end of the guide rod and the housing, and wherein the spring is configured to be compressed when the lead screw nut moves toward the first end of the lead screw.

2. The automatic door operator according to claim 1, wherein the slider is configured as a piston slidably engaged to and within the guide hole;

wherein the piston comprises a receiving recess and wherein the rack portion is disposed on a side wall surface of the receiving recess; and wherein the piston includes a through hole, and the lead screw extends into the receiving recess through the through hole.

3. The automatic door operator according to claim 2, wherein the piston is threadedly engaged with the lead screw nut.

4. The automatic door operator according to claim 3, wherein: the through hole is provided with an internal threaded section, and the lead screw nut is provided with an external threaded section connected to the internal threaded section; and a hole wall of the through hole is provided with a set screw hole, and a set screw abutting against an outer peripheral surface of the lead screw nut is mounted in the set screw hole.

5. The automatic door operator according to claim 2, wherein the receiving recess extends through an outer peripheral surface of the piston.

6. The automatic door operator according to claim 2, wherein an outer peripheral surface of the piston is provided with at least one annular recess, and a wearing ring is mounted within the at least one annular recess.

7. The automatic door operator according to claim 6, wherein the at least one annular recess comprises two annular recesses, and wherein the receiving recess is positioned between the two annular recesses.

8. The automatic door operator according to claim 1, wherein a bearing is disposed between the output shaft and the mounting hole, and an end portion of the output shaft is provided with a face tooth.

9. The automatic door operator according to claim 1, wherein the actuating unit includes a motor and a planetary gear reducer coupled to the motor, and an output end of the planetary gear reducer comprises the output end of the actuating unit.

* * * * *